(12) United States Patent
Hara

(10) Patent No.: US 7,627,136 B2
(45) Date of Patent: Dec. 1, 2009

(54) INFORMATION EMBEDDING DEVICE, INFORMATION DETECTING DEVICE, INFORMATION EMBEDDING AND DETECTING SYSTEM, INFORMATION EMBEDDING METHOD, INFORMATION DETECTING METHOD, INFORMATION EMBEDDING PROGRAM, INFORMATION DETECTING PROGRAM, INFORMATION EMBEDDING AND DETECTING PROGRAM, AND RECORDING MEDIUM

(75) Inventor: Takayuki Hara, Kanagawa (JP)

(73) Assignee: Ricoh Company Ltd., Tokyo (JP)

( * ) Notice: Subject to any disclaimer, the term of this patent is extended or adjusted under 35 U.S.C. 154(b) by 978 days.

(21) Appl. No.: 11/138,520

(22) Filed: May 27, 2005

(65) Prior Publication Data
US 2005/0264851 A1 Dec. 1, 2005

(30) Foreign Application Priority Data
May 31, 2004 (JP) .............................. 2004-161091

(51) Int. Cl.
G06K 9/00 (2006.01)
G06K 9/34 (2006.01)

(52) U.S. Cl. ...................................... 382/100; 382/176

(58) Field of Classification Search ................. 382/100, 382/175–180
See application file for complete search history.

(56) References Cited

U.S. PATENT DOCUMENTS 6,741,722 B2  5/2004  Abe
6,782,509 B1*  8/2004  Hirayama et al. ............ 715/210
6,983,056 B1*  1/2006  Amano ......................... 382/100

FOREIGN PATENT DOCUMENTS

| JP | H05-107728 | 4/1993 |
|----|----|----|
| JP | H06-348808 | 12/1994 |
| JP | 2000-99501 | 4/2000 |
| JP | 2001-78006 | 3/2001 |
| JP | 2001-186326 | 7/2001 |
| JP | 2002-232679 | 8/2002 |
| JP | 2002-232698 | 8/2002 |
| JP | 2003-289435 | 10/2003 |
| WO | WO 03/102947 | 12/2003 |

OTHER PUBLICATIONS

Notice of Rejection of Japanese Patent Application No. 2004-161091 dated Mar. 18, 2008.
Chinese Office Action for Application No. 2005-100720253 dated May 16, 2008.
Notice of Rejection of Japanese Patent Application No. 2004-161091 dated Jul. 8, 2008.

* cited by examiner

Primary Examiner—Wesley Tucker
(74) Attorney, Agent, or Firm—Dickstein Shapiro LLP (57) ABSTRACT

An information embedding device is provided that embeds information in a document image having a character region therein. This information embedding device includes: a character region detecting unit that detects the character region from the document image; a character region dividing unit that divides the character region into a plurality of sub regions; and a feature quantity increasing/decreasing unit that performs an operation to increase or decrease a feature quantity with respect to each of the sub regions to a value that is determined from a pseudorandom number sequence in accordance with predetermined rules.

17 Claims, 9 Drawing Sheets

ORIGINAL IMAGE

IMAGE IN WHICH INFORMATION IS EMBEDDED

SCANNED IMAGE

文書画像は基本的に2値画像で冗長性が少ないため、視覚劣化を抑えかつ印刷耐性を確保したうえで、十分な情報量を埋め込むことは非常に困難である。これを打開するため、文字の特徴や輪郭、背景などを利用する方法が提案されている。

| | | CORRECTION VALUE | | PSEUDORANDOM NUMBER SEQUENCE | | CALCULATED VALUE | | DETECTED BIT | |
|---|---|---|---|---|---|---|---|---|---|
| FIRST LINE: 24716 | ⇨ | 20827 | | −20 | = | 20807 | ⇨ | 1 | (1000*21−500 < 20807 < 1000*21+500) |
| SECOND LINE: 20236 | ⇨ | 16992 | | −1976 | = | 15016 | ⇨ | 1 | (1000*15−500 < 15016 < 1000*15+500) |
| THIRD LINE: 15718 | ⇨ | 13125 | | +3 | = | 13128 | ⇨ | 1 | (1000*13−500 < 13128 < 1000*13+500) |

THE NUMBER OF BLACK PIXELS PER LINE

CORRECTION FUNCTION : $f(x)=0.856x-330$

INFORMATION EMBEDDING DEVICE, INFORMATION DETECTING DEVICE, INFORMATION EMBEDDING AND DETECTING SYSTEM, INFORMATION EMBEDDING METHOD, INFORMATION DETECTING METHOD, INFORMATION EMBEDDING PROGRAM, INFORMATION DETECTING PROGRAM, INFORMATION EMBEDDING AND DETECTING PROGRAM, AND RECORDING MEDIUM

BACKGROUND OF THE INVENTION

1. Field of the Invention

The present invention relates to an information embedding device, an information detecting device, an information embedding and detecting system, an information embedding method, an information detecting method, an information embedding program, an information detecting program, an information embedding and detecting program, and a recording medium. More particularly, the present invention relates to a technique of embedding information in a document image having a character region in such a manner that the information cannot be recognized by the human eye or is difficult to be recognized by the human eye, and a technique of detecting the embedded information.

2. Description of the Related Art

In recent years, techniques of embedding information in digital data such as image data and audio data have been developed in such a manner that the information cannot be recognized by human beings. By such techniques, copyright information can be embedded in data in advance, so that the owner of the copyright can be detected from a copy of the data. In this manner, unauthorized duplication of digital data that is provided over the Internet can be prevented. In the field of information embedding and detecting techniques to which the present invention relates, there are the following conventional techniques.

Japanese Laid-Open Patent Application No. 2000-99501 discloses "Method and System for Embedding Information in Document Data". In this prior art, a method of embedding information in a document file such as a PDF or PS is disclosed. In accordance with this invention, a layout is analyzed, the characters located in a position designated by a pseudorandom number are extracted, and the relative location is controlled. Information embedding is then performed.

Japanese Laid-Open Patent Application No. 2001-78006 discloses "Method and Device for Embedding and Detecting Watermark Information in Black-and-White Binary Document Image". In this prior art, information embedding and detection in a document image which is a binary image are disclosed. An image is divided into sub sections by a structural analysis conducted on the document image, and two or more sub sections form a group. Information embedding and detection are performed through comparison of feature quantities between groups. Japanese Laid-Open Patent Application No. 2002-232679 discloses "Image Processing Method and Apparatus, Computer Program, and Recording Medium". In this prior art, information embedding is performed through quantization of the ratio of the sum of the gaps of neighboring characters to the difference between the gaps of the neighboring characters.

In accordance with each of the above inventions, each information embedded location is extracted with high precision through a structural analysis conducted on a document image. Redundant embedding locations are given to a set of information, so that the information detection can be performed with robustness. However, after the image in which information has been embedded is printed out, the information might be scanned and retrieved. In such a case, limitations are set on the amount of information that can be embedded and the stability in information detection. Here, there is also a problem that the reliability of the detected information cannot be measured.

SUMMARY OF THE INVENTION

A general object of the present invention is to provide an information embedding and detecting technique in which the above disadvantages are eliminated.

A more specific object of the present invention is to provide a technique of embedding information in a document image having a character region in such a manner that the information cannot be recognized by the human eye or is difficult to be recognized by the human eye.

Another specific object of the present invention is to provide an information embedding device, an information detecting device, an information embedding and detecting system, an information embedding method, an information detecting method, an information embedding program, an information detecting program, an information embedding and detecting program, and a recording medium. With any of the above devices, methods, and programs, information is stably embedded in a print image, the information is detected with precision, and the reliability of the detected information can be known to each user.

The above objects of the present invention are achieved by an information embedding device that embeds information in a document image having a character region therein. This information embedding device includes: a character region detecting unit that detects the character region from the document image; a character region dividing unit that divides the character region into sub regions; and a feature quantity increasing and decreasing unit that performs an operation to increase or decrease a feature quantity with respect to each of the sub regions to a value that is determined from a pseudo-random number sequence in accordance with predetermined rules.

In this information embedding device, the predetermined rules to determine the value of the feature quantity involve the multiples of a suitable constant, and the information embedding device further includes a pseudorandom number adding unit that separates odd-number multiples from even-number multiples in accordance with the bit value of the information to be embedded, and adds the value of a pseudorandom number to the obtained value.

In this information embedding device, the character region dividing unit divides the character region into the sub regions by selecting one or a combination of a circumscribed quadrangle of paragraphs, a circumscribed quadrangle of columns, and a circumscribed quadrangle of characters.

In this information embedding device, the feature quantity of the sub regions is represented by one or a combination of the number of pixels in a particular color, the number of particular topologies, line spacing, neighboring character spacing, a character rotation angle, and a circumscribed quadrangle area.

The above objects of the present invention are also achieved by an information detecting device that detects information embedded in a document image. This information detecting device includes: a character region detecting unit that detects a character region from the document image; a character region dividing unit that divides the detected character region into sub regions; a feature quantity extracting unit that extracts the feature quantity of the sub regions; and an information value determining unit that determines the value of the embedded information by comparing the feature quantity of the sub regions with a value that is determined from a pseudorandom number sequence.

In this information detecting device, the character region dividing unit divides the character region into sub regions by selecting one or a combination of a circumscribed quadrangle of paragraphs, a circumscribed quadrangle of columns, and a circumscribed quadrangle of characters.

This information detecting device further includes a feature quantity correcting unit that corrects the feature quantity obtained by the feature quantity extracting unit prior to the determination by the information value determining unit.

In this information detecting device, the feature quantity correcting unit includes: a test image reading unit that reads a test image in which an arbitrary feature quantity is preset; a correction function identifying unit that identifies a correction function, based on the correspondence of the read value to the preset value in the test image; and a correction operating unit that performs correction using the correction function.

This information detecting device further includes: a correction error detecting unit that calculates an error in the correction function; and an error detection rate detecting unit that calculates an error detection rate as to information embedded in an unknown image.

The above objects of the present invention are also achieved by an information embedding and detecting system that embeds information with the above information embedding device, and performs the information detection with the information detecting device. In this system, the information embedding device and the information detecting device use the same pseudorandom number sequence.

The above objects of the present invention are also achieved by a method of embedding information in a document image having a character region. This method includes the steps of: detecting the character region from the document image; dividing the character region into sub regions; and performing an operation to increase or decrease the feature quantity with respect to each of the sub regions, to a value that is determined from a pseudorandom number sequence according to predetermined rules.

In this method, the predetermined rules to determine the value of the feature quantity involve the multiples of a suitable constant. This method further includes the step of adding the value of a pseudorandom number to the value obtained by separating odd-number multiples from even-number multiples in accordance with the bit value of the information to be embedded.

In this method, the character region dividing step is carried out with one or a combination of a circumscribed quadrangle of paragraphs, a circumscribed quadrangle of columns, and a circumscribed quadrangle of characters.

In this method, the feature quantity of the sub regions is represented by one or a combination of the number of pixels in a particular color, the number of particular topologies, line spacing, neighboring character spacing, a character rotation angle, and a circumscribed quadrangle area.

The above objects of the present invention are also achieved by a method of detecting information that is embedded in a document image. This method includes the steps of: detecting a character region from the document image; dividing the character region into sub regions; extracting the feature quantity of the sub regions; and determining the value of the embedded information by comparing the feature quantity of the sub regions with a value that is determined from a pseudorandom number sequence.

In this method, the character region dividing step is carried out with one or a combination of a circumscribed quadrangle of paragraphs, a circumscribed quadrangle of columns, and a circumscribed quadrangle of characters.

This method further includes the step of correcting the feature quantity obtained in the feature quantity extracting step. The feature quantity correcting step is carried out prior to the information value determining step.

In this method, the feature quantity correcting step includes the steps of: reading a test image in which an arbitral feature quantity is preset; identifying a correction function based on the correspondence of the read value to the preset value in the test image; and performing correction using the correction function.

In this method, the feature quantity of the sub regions is represented by one or a combination of the number of pixels in a particular color, the number of particular topologies, line spacing, neighboring character spacing, a character rotation angle, and a circumscribed quadrangle area.

The above objects of the present invention are also achieved by a method of embedding and detecting information by the above information embedding method and the above information detecting method. Here, the same pseudorandom number sequence is used in the information embedding method and the information detecting method.

The above objects of the present invention are also achieved by an information embedding program that causes a computer to carry out the respective steps in the above information embedding method.

The above objects of the present invention are also achieved by an information detecting program that causes a computer to carry out the respective steps in the above information detecting method.

The above objects of the present invention are also achieved by an information embedding and detecting program that causes a computer to carry out the respective steps in the above information embedding and detecting method.

The above objects of the present invention are also achieved by a recording medium that can be read by a computer in which the programs can be stored.

In accordance with the present invention, information can be embedded in a document image having a character region in such a manner that the information cannot be recognized by the human eye or is difficult to be recognized by the human eye. Also, the embedded information can be detected. Information can also be stably embedded in a printed document image, and can be detected. Further, the reliability of the detected information can be notified to users.

More specifically, in accordance with the present invention, the structure of a document is analyzed to extract only the character region. The character region is then divided by a known document analyzing technique in terms of paragraphs, lines, and characters. A unit region in which information is to be embedded is then extracted. Normally, a printed image contains deformation due to a positional shift or a rotation. In the present invention, however, an information embedding location that is not to be affected by the deformation can be designated.

After an embedding region is extracted, information is embedded while the feature quantity calculated from the region is controlled in accordance with predetermined rules. Since the rules require a pseudorandom number sequence as parameters, it is difficult for a third person to determine whether embedded information exists.

In accordance with the present invention, embedded information can be detected in accordance with same rules as the rules that are used in the embedding region extracting process. When embedded information is to be detected, the rules and the pseudorandom number sequence used for the embedding are required. Therefore, it is very difficult for a third person to detect the embedded information.

Also, in accordance with the present invention, a correction function for correcting image variations depending on the reader device that are measured in advance is used at the time of information detection, so as to reproduce the feature quantity of the information embedding time. This correction function is identified by reading a test image having a known feature quantity in advance. Through a correcting operation using the correction function, the accuracy in detecting information from a printed image can be increased.

Further, in accordance with the present invention, the error in the correction function obtained at the time of identifying the correction function is used to estimate an error detection rate. Thus, a user can recognize the reliability of the information detected by the above method, using the above device and the above information recording medium.

The above and other objects, features, and advantages of the present invention will become more apparent from the following detailed description taken in conjunction with the accompanying drawings.

DESCRIPTION OF THE PREFERRED EMBODIMENTS

The following is a description of embodiments of the present invention, with reference to the accompanying drawings.

In the embodiments described below, a method of embedding information in a black-and-white binary document image that consists of characters and graphics only including Japanese sentences without horizontal column setting is described together with a device that operates in accordance with the method. In the following embodiments, the feature quantity to be used for information embedding is the number of black pixels in each line.

[Information Embedding/Detecting Method]

First, a information embedding method and an information detecting method in accordance with the present invention are described.

<Information Embedding>

Figure 1:
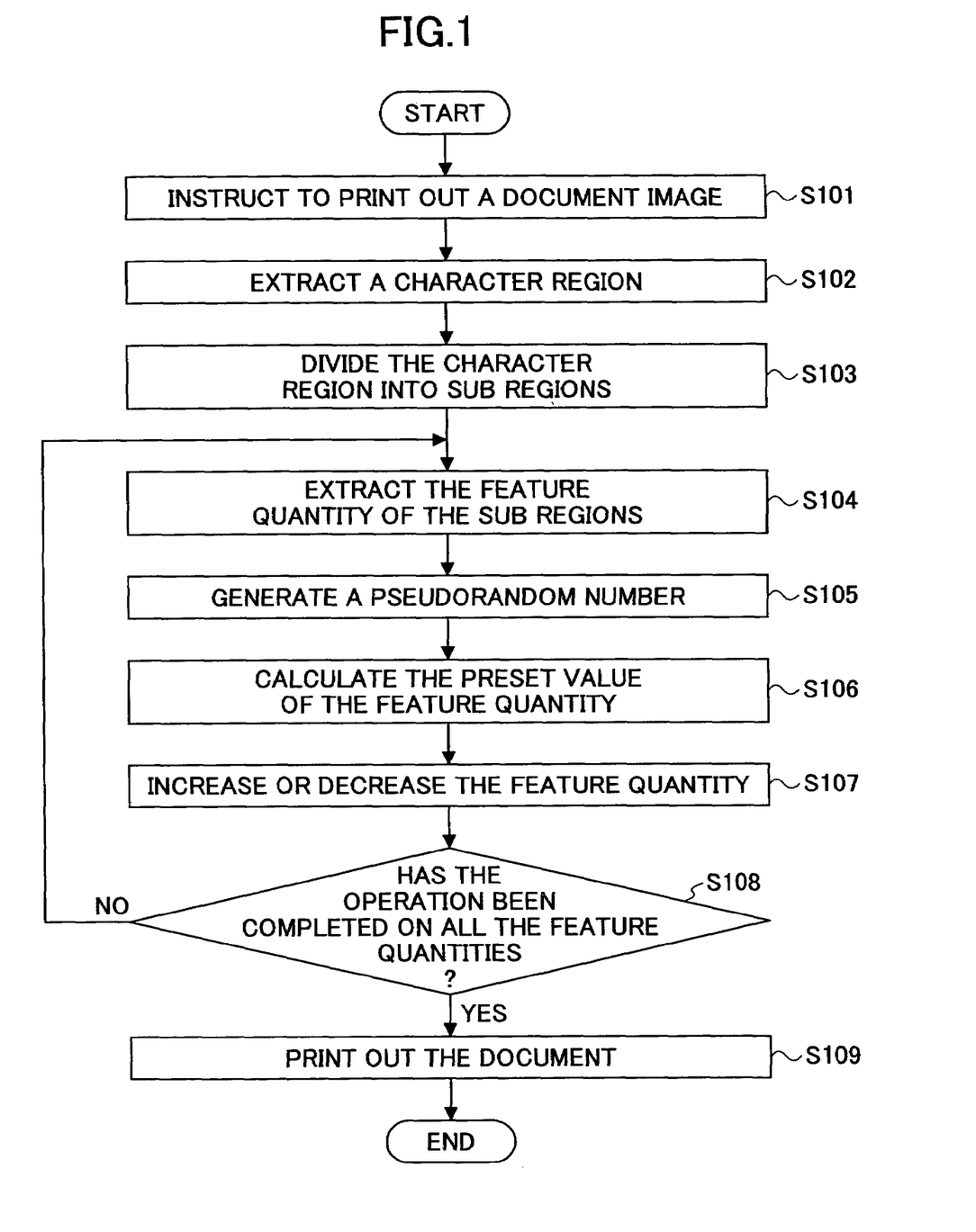
FIG. 1 is a flowchart of an operation by an information embedding method in accordance with the present invention.

FIG. 1 is a flowchart of the information embedding operation in accordance with the present invention. This information embedding operation is performed through the following steps.

In step S101, an instruction to print out a document image is issued.

In step S102, the character region and the graphical region are separated from the document image, and the character region is detected from the image.

In step S103, the character region is divided into sub regions. In this embodiment, the dividing is performed by the row. A histogram having black pixels added up in the horizontal direction is created. When this histogram exceeds a threshold value, it is determined that there is a row while the histogram is over the threshold value, and the circumscribed quadrangle surrounding the row is regarded as a sub region.

In step S104, the feature quantity of the sub region is extracted. Here, the feature quantity is represented by the number of black pixels in the region, and therefore, the black pixels are counted.

In step S105, a pseudorandom number is generated. The type of the sequence of the pseudorandom number is stored as key information.

In step S106, the preset value of the feature quantity is calculated by adding the information to be embedded and the value of the pseudorandom number. More specifically, the pseudorandom number generated in step S105 is divided by "a". A pseudorandom number is represented by "b". The value of the feature quantity is "x", and the quantization unit is represented by "q". When information "1" is to be embedded, the value that is closest to "x" among the values obtained by adding "b" to the multiples of "q" by odd numbers is set as the preset value. When information "0" is to be embedded, the value that is closest to "x" among the values obtained by adding "b" to the multiples of "q" by even numbers is set as the preset value.

Figure 4:
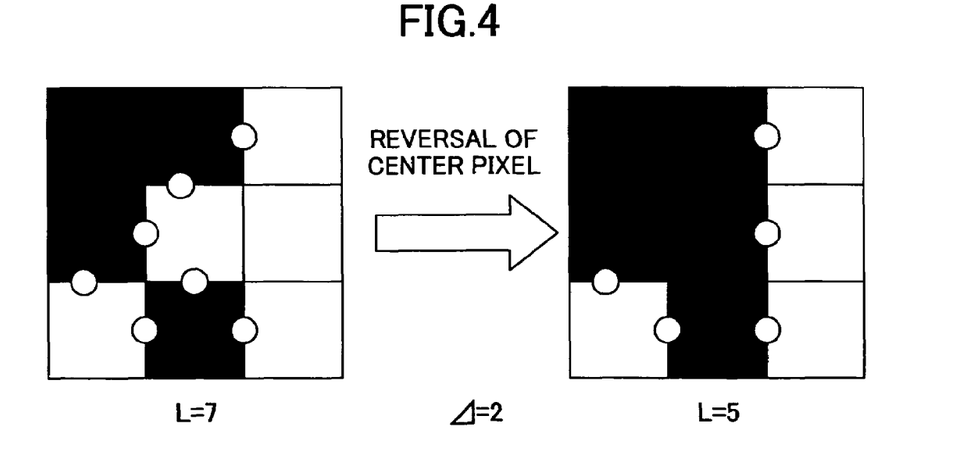
FIG. 4 illustrates the outline length in 3×3 a block.

In step S107, the feature quantity is increased or decreased to the preset value calculated in step S106. The number of black pixels, which is the feature quantity, is increased or decreased so that the deterioration to the human eye can be reduced as much as possible. Here, the priorities of pixel modifications are determined by the following two criteria. 1) Priority should be given to a block that has pixels varying in such a complicated manner as not to be obvious to the human eye. 2) Modifications should be made with as small changes as possible in the complexity. More specifically, the complexity is represented by the outline length of the four vicinities in a 3×3 block. The outline length in the block is set to L, the difference (an absolute value) in the outline quantity that varies with the reversal of the pixel at the center of the block is $\Delta$, and the value of $J=L-6.5\times\Delta$ is the priority of modifications to be made to the pixel at the center of the block. FIG. 4 shows examples of cases with L and $\Delta$.

In FIG. 4, the parts indicated by circles (○) are equivalent to the outline, and the number of the circles represents the outline length. The figure on the right-hand side is obtained by reversing the center pixel of the figure on the left-hand side. In this case, the difference $\Delta$ is 2, and the priority can be calculated as $7-6.5\times2=-6$.

The priority is calculated in the above described manner, and the modification is repeated until the target number of black pixels is obtained, starting from the block with the largest priority value. Here, in the case where the number of black pixels is to be increased, only the blocks with white centers are modified, and, in the case where the number of black pixels is to be reduced, only the blocks with black centers are modified.

In step S108, whether the feature quantity control has been completed in all the sub regions is determined.

If the feature quantity control has been completed in all the sub regions, the operation moves on to step S109. If there are one or more sub regions in which the feature quantity control has not been completed, the operation returns to step S104.

In step S109, the document image on which the feature quantity control has been performed is printed out, and the operation comes to an end.

Figure 5A:
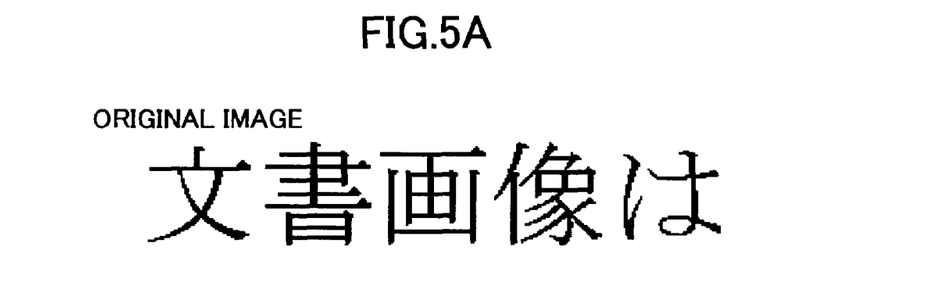
FIG. 5A illustrates an image before information is embedded.
Figure 5B:
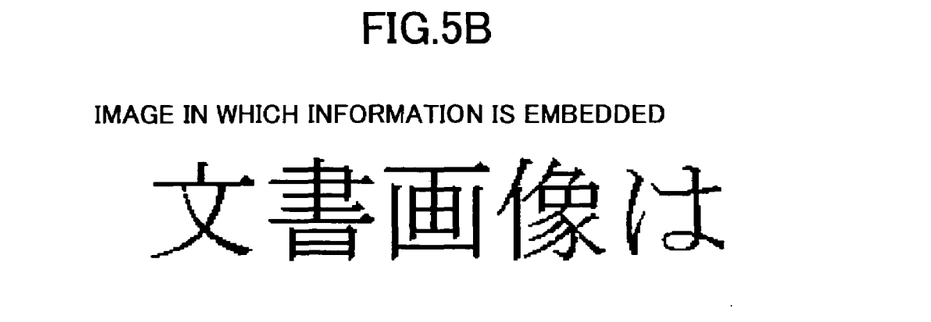
FIG. 5B illustrates an image after information is embedded by the information embedding method in accordance with the present invention.

FIGS. 5A and 5B illustrate examples of document images before and after information is embedded in the above described manner.

Figure 6A:
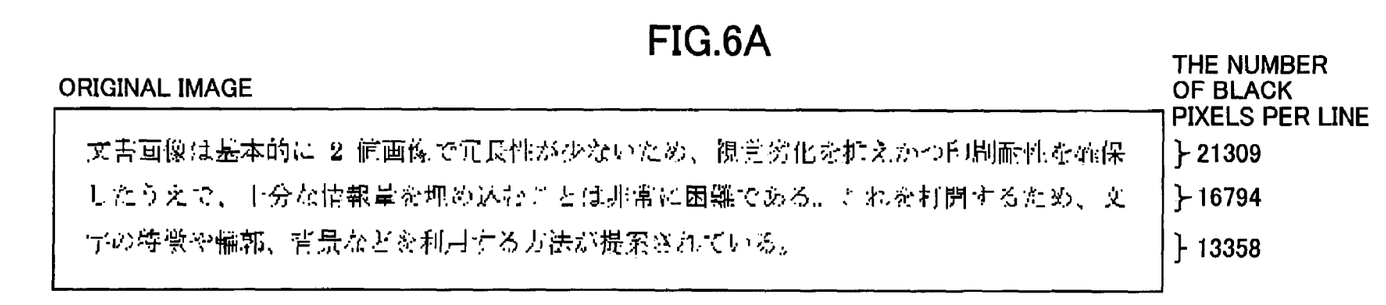
FIG. 6A shows an image before information is embedded.
Figure 6B:
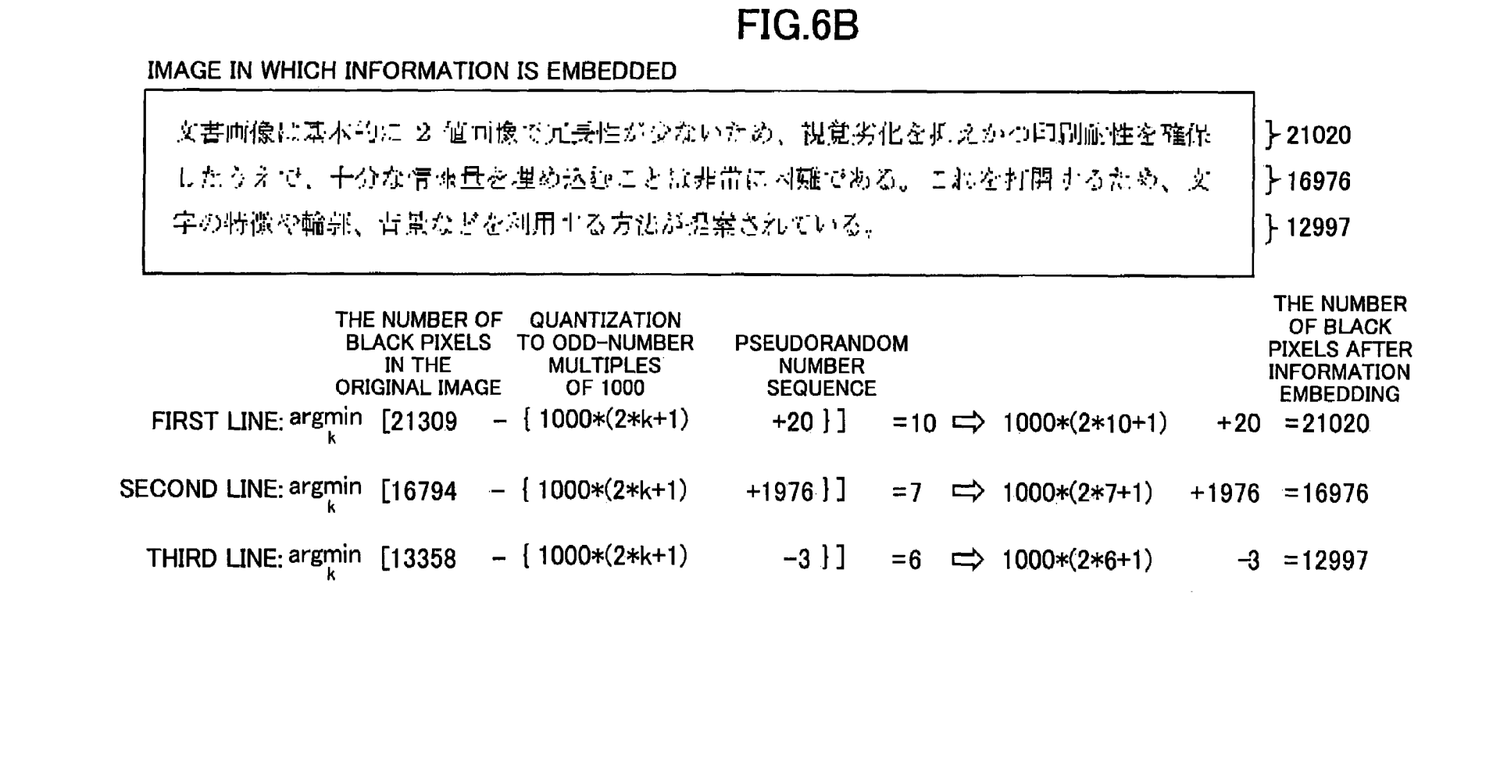
FIG. 6B shows an image in which information has been embedded and an embedding operation by the information embedding method in accordance with the present invention.

FIG. 6A illustrates a document image before information is embedded, and FIG. 6B illustrates a case where a bit string "111" is embedded by the information embedding method, with the unit of quantization q being "1000", and the pseudorandom number sequence bn being "20, 1976, −3".

<Information Detection>

Figure 2:
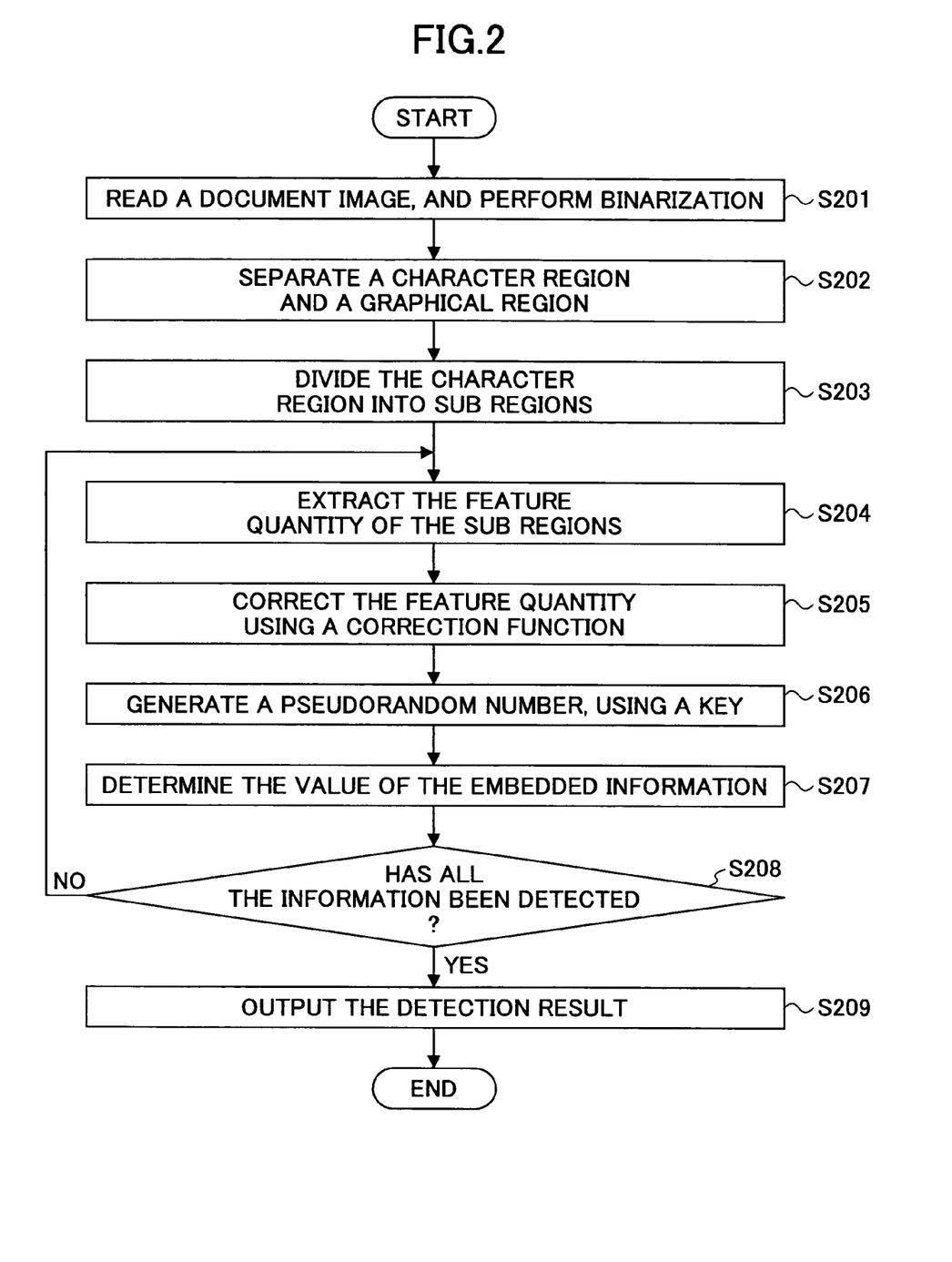
FIG. 2 is a flowchart of an information detecting operation in accordance with the present invention.

FIG. 2 is a flowchart of an information detecting method in accordance with the present invention. This information detecting method includes the following steps.

In step S201, a document is scanned with a scanner, and is read in as a document image. At this point, binarization is performed using a given threshold value.

In step S202, a character region and a graphical region are separated from the document image.

In step S203, the character region is divided into sub regions in the same manner as in step S103.

In step S204, the feature quantity of the sub regions is extracted in the same manner as in step S104.

In step S205, the value of the feature quantity is corrected, using a predetermined correction function. This correction function identifying method will be described later as steps S301 through S309.

In step S206, a pseudorandom number is generated using the key information that is stored in step S105.

In step S207, the value of the embedded information is determined. The value "x'−b" that is obtained by subtracting the pseudorandom number "b" generated in step S206 from the feature quantity "x'" corrected in step S205 is divided by the same quantization unit q as in step S107, so as to obtain a quotient "p" and a remainder "r". In the case where "p" is an odd number and "r" is smaller than q/2, or where "p" is an even number and "r" is greater than q/2, the information "1" is determined to be embedded. In cases other than the above, the information "0" is determined to be embedded. In step S208, whether the information determination has been completed in all the sub regions is determined. If the determination has been completed in all the sub regions, the operation moves on to step S209. If there are one or more sub regions in which the determination has not been completed, the operation returns to step S204. In step S209, the detected information is output, so that the information can be displayed on a display device, can be stored in files, or can be printed out.

Figure 7:
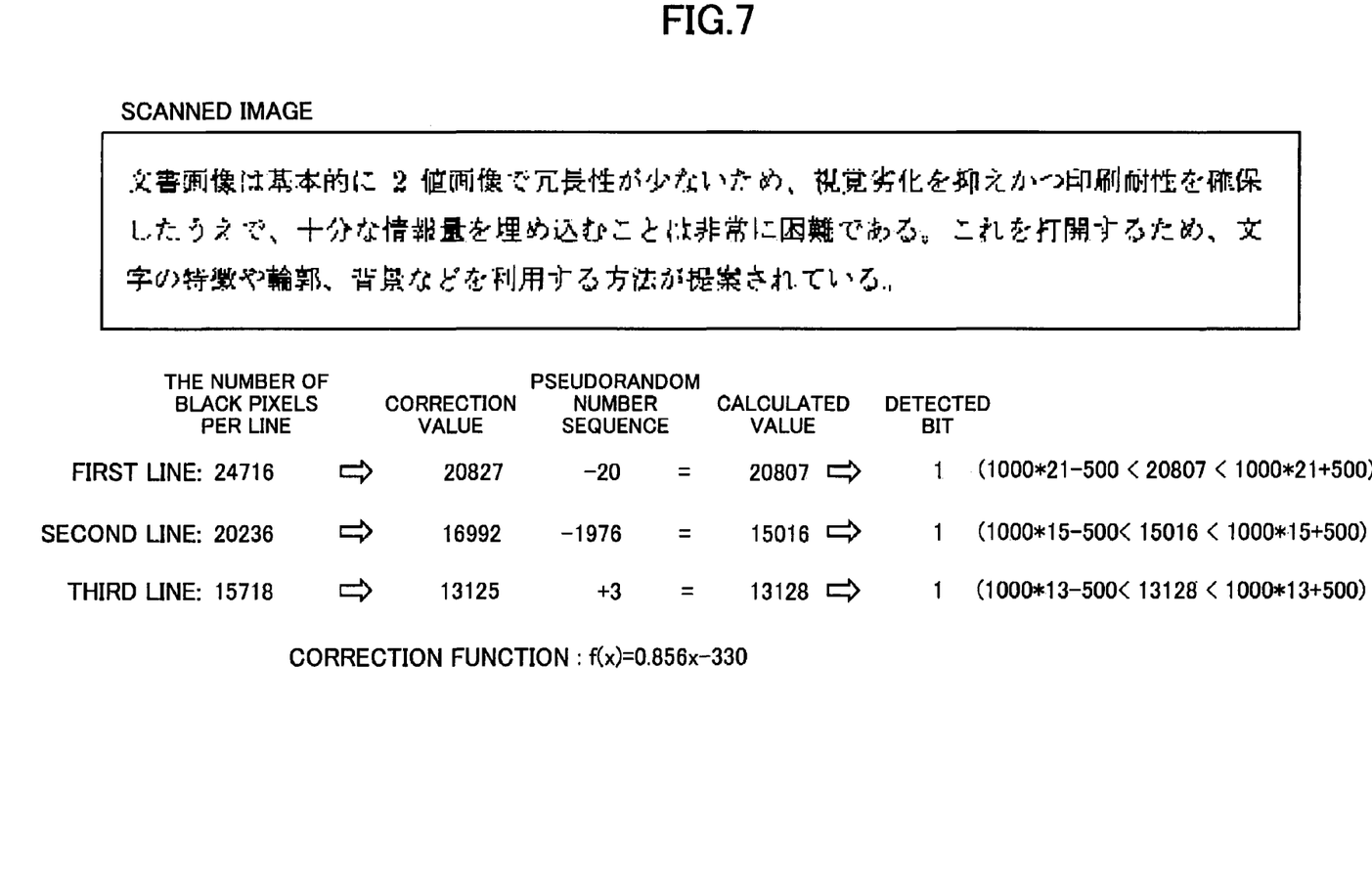
FIG. 7 illustrates the information detecting operation.

FIG. 7 illustrates an example of the operation of scanning an image having the information of FIG. 6B embedded therein after printout, and detecting the information from the scanned image. In FIG. 7, the information "111" is detected, using the quantization unit q=1000 and the pseudorandom number bn="20, 1976, −3", which are the same as those used in the embedding process.

<Identifying the Correction Function of the Feature Quantity>

Figure 3:
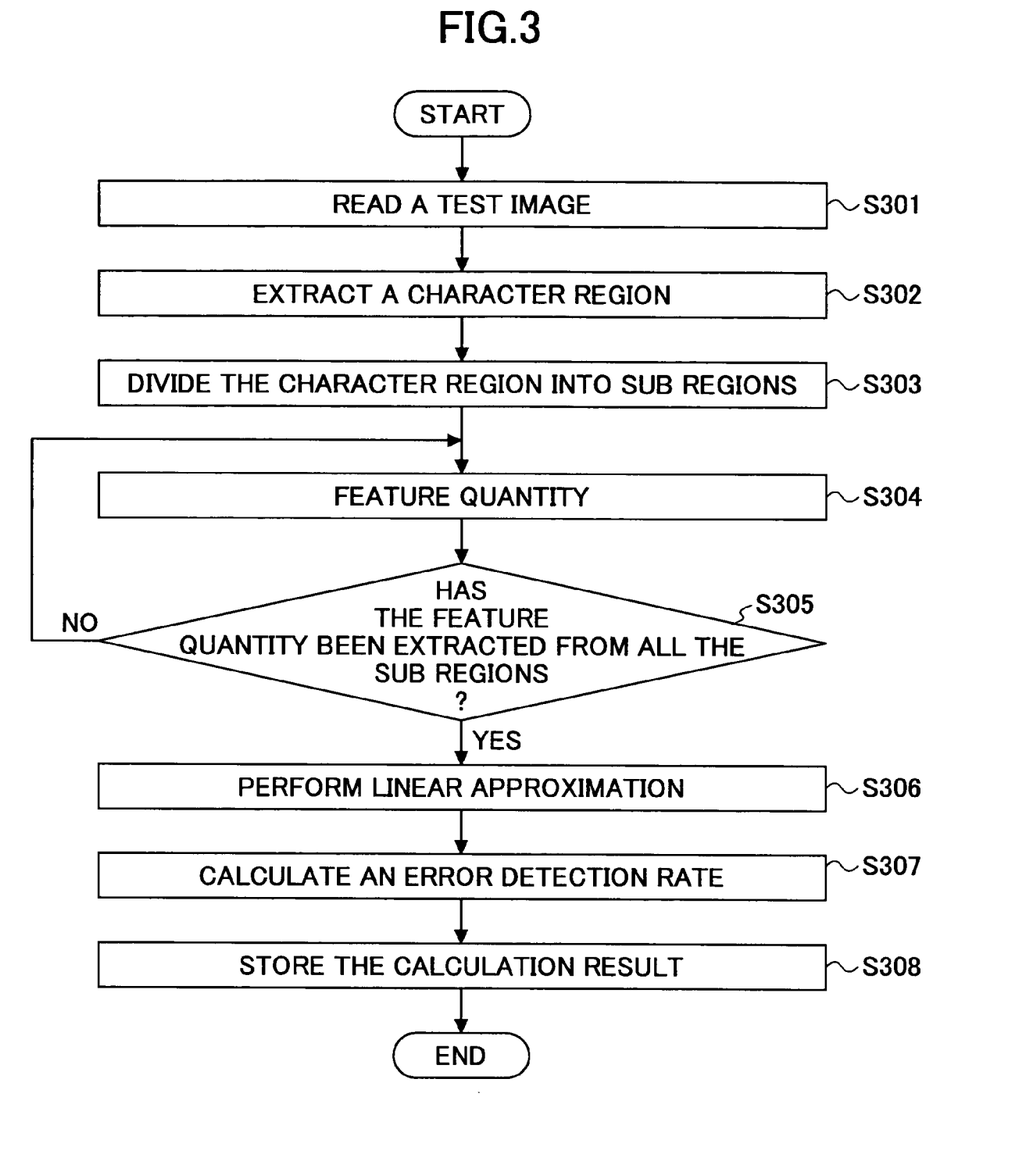
FIG. 3 is a flowchart of a correction function identifying operation in accordance with the present invention.

Next, the correction function identifying process of step S205 is described. This correction function is calculated every time scanning is performed to read an image. The correction function once identified can be permanently used, unless a remarkably large change is caused in the characteristics of the reader device in a later information detecting step. The flowchart of the correction function identifying operation is shown in FIG. 3, and the steps in the operation are described below.

In step S301, a test image is scanned with a scanner, and is read in as a document image. At this point, binarization is performed using the same threshold value as that in step S201. The test image is a black-and-white binarized document image that shows characters in the form of Japanese sentences and does not have horizontal writing columns. This document image is designed to have a wide distribution of the feature quantity (the number of black pixels) of each column. Also, the value of the feature quantity at the time of production is preset.

In step S302, the character region and the graphical region are separated from the document image.

In step S303, the character region is divided into sub regions in the same manner as in step S103. In step S304, the feature quantity of the sub regions is extracted in the same manner as in step S104.

In step S305, whether the extraction of the feature quantity has been completed in all the sub regions is determined. If the extraction has been completed in all the sub regions, the operation moves on to step S306. If there are one or more sub regions in which the extraction has not been completed, the operation returns to step S304.

Figure 8:
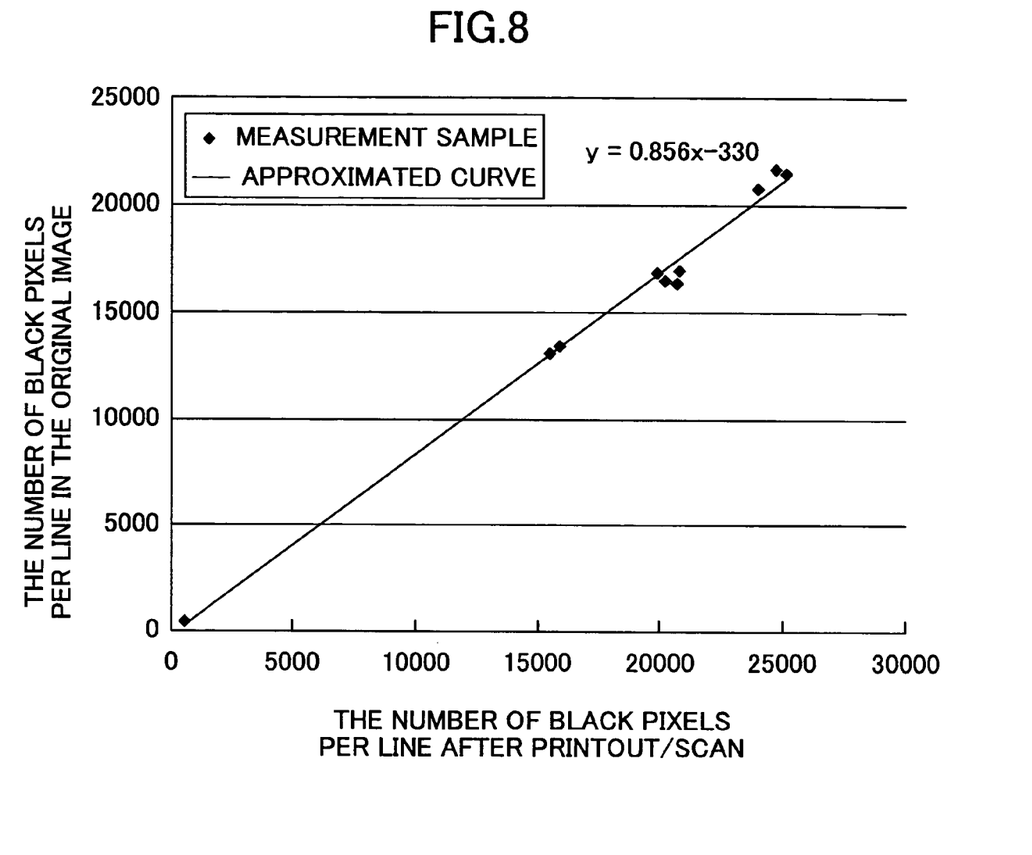
FIG. 8 illustrates the correction function identifying operation.

In step S306, the mapping relationship between the feature quantity extracted in step S304 and the feature quantity at the time of the test image production in the corresponding sub regions is linearly approximated by the least-squares method. FIG. 8 shows an example of the linear approximation. The function obtained here is set as the correction function to be used in step S205.

Figure 9:
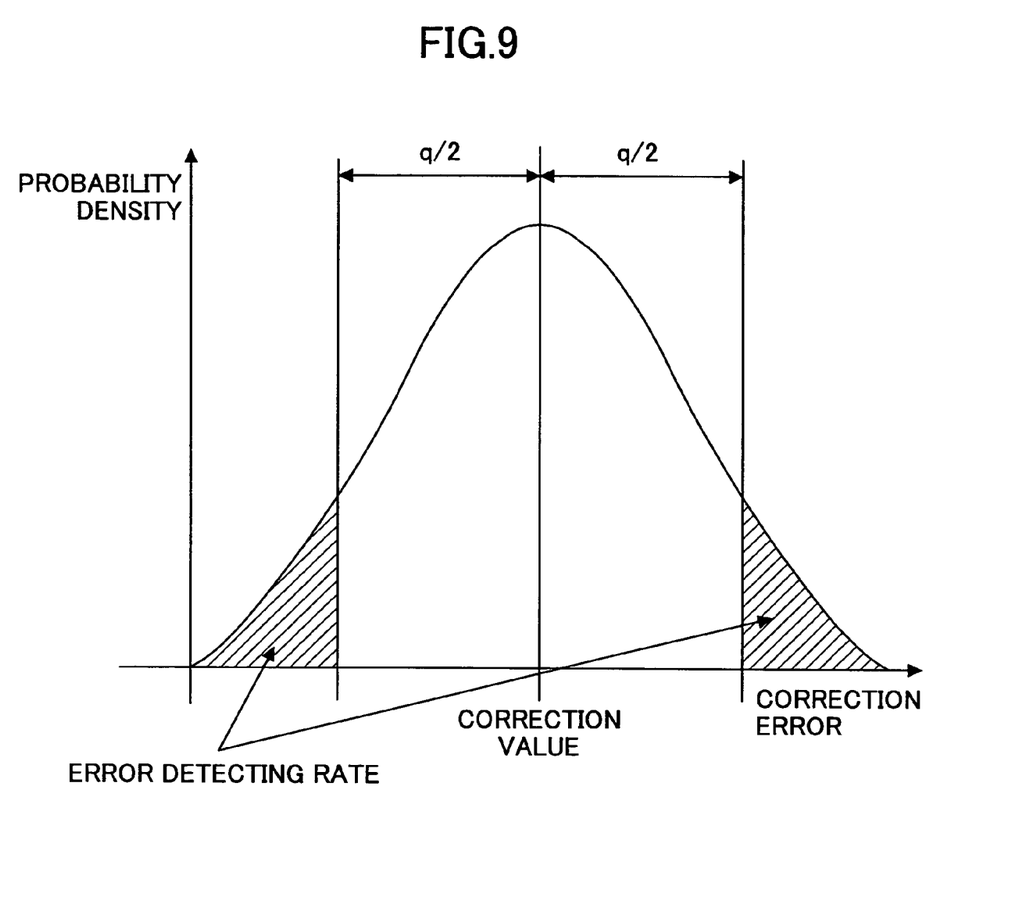
FIG. 9 illustrates an error detecting rate estimating operation.

In step S307, an error detection rate is calculated using the error in the correction function obtained in step S306 and the quantization unit "q" used in step S107. The probability density distribution of the error in the correction function is calculated by the maximum likelihood estimate method, so as to obtain the probability of the output value of the correction function ±q/2 outside the section. This probability is set as the estimate value of the error detection rate (see FIG. 9). The value of the error detection rate is displayed on a display device, so as to notify the user. Further, the value of the error detection rate is stored in the storage medium in the scanner or the information detecting device, so that the user can refer to it anytime.

In step S308, the correction function obtained in step S306 is stored in the storage medium in the scanner or the information detecting device, so that the information detecting device can refer to it at the time of information detection.

<Information Embedding/Detecting Device>

Figure 10:
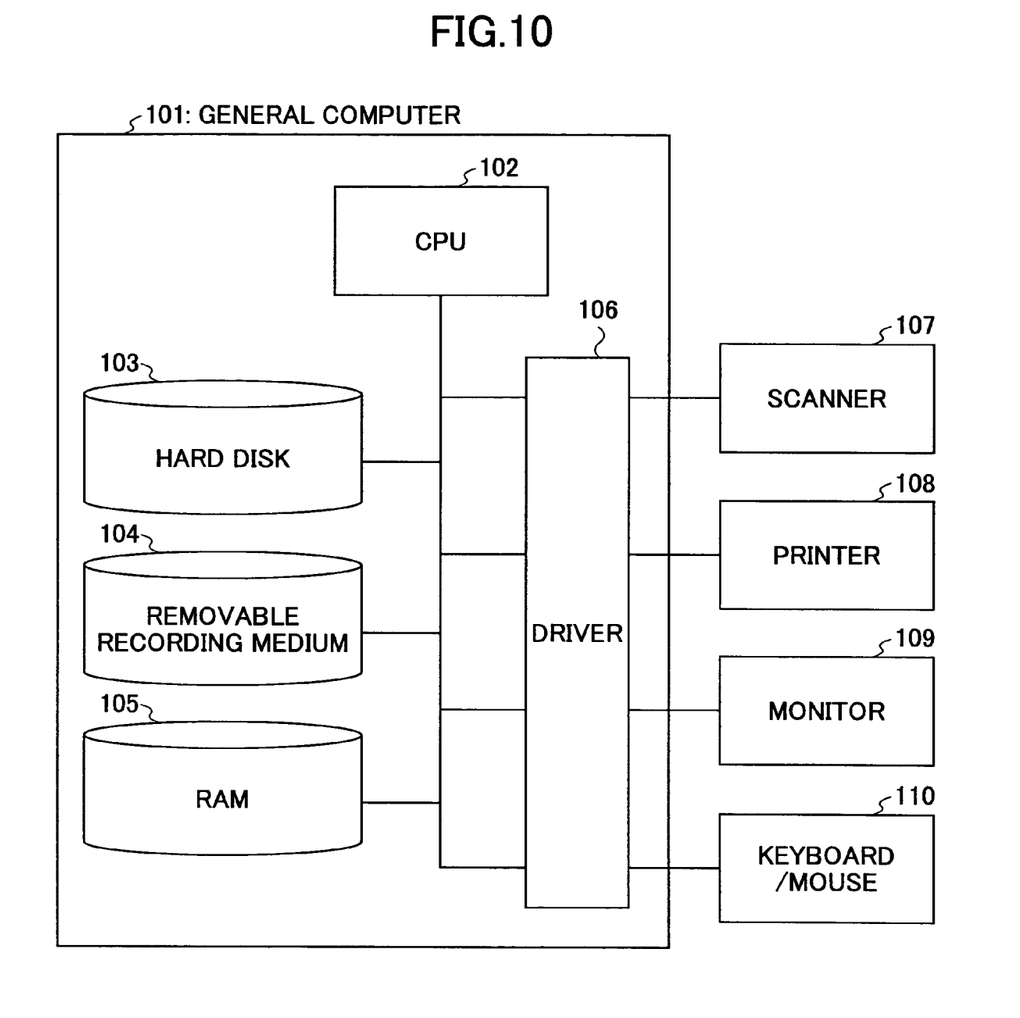
FIG. 10 schematically illustrates an information embedding device in accordance with the present invention.

FIG. 10 illustrates an example of a device that embodies the above described information embedding method and the information detecting method.

As shown in FIG. 10, a personal computer is employed as a general computer 101. A CPU 102 controls each module in the general computer 101, and can execute a program that is recorded on a recording medium. A hard disk 103 stores image files, and records the programs that are to embody the above described information embedding method and the information detecting method. A removable recording medium 104 may be a floppy disk, an MO, a CD-ROM/R/RW, or a DVD-ROM/R/RW, for example. Like the hard disk 103, the removable recording medium 104 stores image files, and records the information embedding and detecting programs.

A RAM 105 temporarily holds programs and images that are processed by the CPU. A driver 106 can exchange data with a later described device and the general computer 101. A scanner 107 reads an image in which information is to be embedded, an image in which information has been embedded, and a test image for identifying a correction function. A printer 108 prints out an image in which information is embedded. A monitor 109 displays information to be embedded or an error detection rate, for example. A keyboard/mouse 110 is used to instruct the execution of the information embedding/detecting programs, and inputs the contents of the information to be embedded.

With the above structure, the information embedding is performed in the following manner. First, an image is read in with the scanner 107, or image data that is recorded on the hard disk 103 or the removable recording medium 104 is read out and loaded in the RAM 105. Application is activated through the keyboard/mouse 110. Information to be embedded is then selected on the application, or information is input through the keyboard. An instruction to embed information is then issued through the keyboard/mouse 110, and the information is embedded in accordance with the program that embodies the above described information embedding method. The image in which the information has been embedded is recorded on the hard disk 103 or the removable recording medium 104, or is printed out by the printer 108.

Next, the information detecting operation to be performed by this structure is described. An image from which information is to be detected is read in with the scanner 107, or the image data recorded on the hard disk 103 or the removable recording medium 104 is read out and is loaded in the RAM 105. Application is activated through the keyboard/mouse 110. When an instruction to embed information is issued, the program that embodies the above described information detecting method is activated. The detected information may be displayed on the monitor 109, stored on the hard disk 103 or the removable recording medium 104, or printed out by the printer 108.

Next, the feature quantity correction function identifying operation to be performed with this structure is described. First, application is activated through the keyboard/mouse 110, and a test image that is produced with the predetermined feature quantity is read in with the scanner 107. The reading image data is loaded in the RAM 105, and the type or ID of the scanner that has read the test image is read in. When an instruction to perform a correction function identifying operation is issued, the program that embodies the above described correction function identifying method is activated, and the correction function is identified. The identified correction function is associated with the type or ID of the scanner that is used to read the test image. The identified correction function is then recorded on the hard disk 103 or the removable recording medium 104. If the same scanner is used to detect information in a later stage, the correction function will be referred to. Also, based on the identification error obtained secondarily at the time of the correction function identification, the error detecting rate in this system is calculated. The value of the error detecting rate may be displayed on the monitor 109, or may be recorded on the hard disk 103 or the removable recording medium 104 in association with the type or ID of the scanner, or may be printed out by the printer 108.

In accordance with the present invention, an information embedding device and an information detecting device may be manufactured separately from each other, or may be manufactured as an integrated system.

It should be noted that the present invention is not limited to the embodiments specifically disclosed above, but other variations and modifications may be made without departing from the scope of the present invention.

This patent application is based on Japanese Priority Patent Application No. 2004-161091, filed on May 31, 2004, the entire contents of which are hereby incorporated by reference.

What is claimed is:

1. An information embedding device that embeds information in a document image having a character region therein, comprising:
    a character region detecting unit that detects the character region from the document image;
    a character region dividing unit that divides the character region into a plurality of sub regions; and
    a feature quantity increasing and decreasing unit that performs an operation to increase or decrease a feature quantity with respect to each of the sub regions to a value that is determined from a pseudorandom number sequence in accordance with predetermined rules,
    wherein the predetermined rules to determine the value of the feature quantity involve the multiples of a suitable constant; and
    the information embedding device further comprising
    a pseudorandom number adding unit that separates odd-number multiples from even-number multiples in accordance with the bit value of the information to be embedded, and adds the value of a pseudorandom number to the obtained value.

2. The information embedding device as claimed in claim 1, wherein the character region dividing unit divides the character region into the plurality of sub regions by selecting one or a combination of a circumscribed quadrangle of paragraphs, a circumscribed quadrangle of columns, and a circumscribed quadrangle of characters.

3. The information embedding device as claimed in claim 1, wherein the feature quantity of the sub regions is represented by one or a combination of the number of pixels in a particular color, the number of particular topologies, line spacing, neighboring character spacing, a character rotation angle, and a circumscribed quadrangle area.

4. An information embedding and detecting system that embeds information with the information embedding device as claimed in claim 1, and performs information detection with an information detecting device comprising:
    the character region detecting unit and the character region dividing unit of the information embedding device;
    a feature quantity extracting unit that extracts the feature quantity with respect to each of the sub regions; and
    an information value determining unit that determines the value of the embedded information by comparing the feature quantity with respect to each of the sub regions with a value determined from the pseudorandom number sequence, wherein the information embedding device and the information detecting device use the same pseudorandom number sequence.

5. An information detecting device that detects information embedded in a document image, comprising:

a character region detecting unit that detects a character region from the document image;

a character region dividing unit that divides the detected character region into a plurality of sub regions;

a feature quantity extracting unit that extracts a feature quantity associated with each of the sub regions;

an information value determining unit that determines the value of the embedded information by comparing the feature quantity associated with each of the sub regions with a value determined from a pseudorandom number sequence; and a feature quantity correcting unit that corrects the feature quantity obtained by the feature quantity extracting unit prior to the determination by the information value determining unit, wherein the feature quantity correcting unit comprises:

a test image reading unit that reads a test image in which an arbitrary feature quantity is preset;

a correction function identifying unit that identifies a correction function, based on the correspondence of the read value to the preset value in the test image; and a correction operating unit that performs correction using the correction function.

6. The information detecting device as claimed in claim 5, wherein the character region dividing unit divides the character region into the plurality of sub regions by selecting one or a combination of a circumscribed quadrangle of paragraphs, a circumscribed quadrangle of columns, and a circumscribed quadrangle of characters.

7. The information detecting device as claimed in claim 5, further comprising:

a correction error detecting unit that calculates an error in the correction function; and an error detection rate detecting unit that calculates an error detection rate as to information embedded in an unknown image.

8. A method of embedding information in a document image having a character region using an information embedding device including a character region detecting unit, a character region dividing unit, a feature quantity increasing and decreasing unit, and a pseudorandom number adding unit, the information embedding device being controlled by a processor configured to carry out the method, the method comprising the steps of:

detecting the character region from the document image using the character region detecting unit;

dividing the character region into a plurality of sub regions using the character region dividing unit; and performing an operation using the feature quantity increasing and decreasing unit to increase or decrease a feature quantity with respect to each of the sub regions, to a value that is determined from a pseudorandom number sequence according to predetermined rules, wherein the predetermined rules to determine the value of the feature quantity involve the multiples of a suitable constant, and the method further comprises the step of using the pseudorandom number adding unit to add the value of a pseudorandom number to the value obtained by separating odd-number multiples from even-number multiples in accordance with the bit value of the information to be embedded.

9. The method as claimed in claim 8, wherein the character region dividing step is carried out with one or a combination of a circumscribed quadrangle of paragraphs, a circumscribed quadrangle of columns, and a circumscribed quadrangle of characters.

10. The method as claimed in claim 8, wherein the feature quantity of the sub regions is represented by one or a combination of the number of pixels in a particular color, the number of particular topologies, line spacing, neighboring character spacing, a character rotation angle, and a circumscribed quadrangle area.

11. A method of embedding and detecting information by the information embedding method as claimed in claim 8 and an information detecting method comprising the steps of:

detecting the character region from the document image using the character region detecting unit;

dividing the character region into the plurality of sub regions using the character region dividing unit;

extracting the feature quantity with respect to each of the sub regions using a feature quantity extracting unit; and determining the value of the embedded information using an information value determining unit by comparing the feature quantity with respect to each of the sub regions with a value that is determined from the pseudorandom number sequence, with the same pseudorandom number sequence being used in the information embedding method and the information detecting method.

12. An information embedding program stored on a computer readable medium that causes a computer to carry out the respective steps in the information embedding method as claimed in claim 8.

13. An information embedding program stored on a computer readable medium that causes a computer to carry out the respective steps in the information embedding and detecting method as claimed in claim 11.

14. A method of detecting information that is embedded in a document image using an information detecting device including a character region detecting unit, a character region dividing unit, a feature quantity extracting unit, an information value determining unit, and a feature quantity correcting unit, the information detecting device being controlled by a processor configured to carry out the method, the method comprising the steps of:

detecting a character region from the document image using the character region detecting unit;

dividing the character region into a plurality of sub regions using the character region dividing unit;

extracting a feature quantity associated with each of the sub regions using the feature quantity extracting unit;

determining the value of the embedded information using the information value determining unit by comparing the feature quantity associated with each of the sub regions with a value that is determined from a pseudorandom number sequence; and correcting the feature quantity obtained in the feature quantity extracting step using the feature quantity correcting unit, the feature quantity correcting step being carried out prior to the information value determining step, wherein the feature quantity correcting step comprises the steps of:

reading a test image in which an arbitral feature quantity is preset;

identifying a correction function based on the correspondence of the read value to the preset value in the test image; and performing correction using the correction function.

15. The method as claimed in claim 14, wherein the character region dividing step is carried out with one or a combination of a circumscribed quadrangle of paragraphs, a circumscribed quadrangle of columns, and a circumscribed quadrangle of characters.

16. The method as claimed in claim 14, wherein the feature quantity of the sub regions is represented by one or a combination of the number of pixels in a particular color, the number of particular topologies, line spacing, neighboring character spacing, a character rotation angle, and a circumscribed quadrangle area.

17. An information embedding program stored on a computer readable medium that causes a computer to carry out the respective steps in the information detecting method as claimed in claim 14.

* * * * *

UNITED STATES PATENT AND TRADEMARK OFFICE
CERTIFICATE OF CORRECTION

| | | |
|---|---|---|
| PATENT NO. | : 7,627,136 B2 | Page 1 of 1 |
| APPLICATION NO. | : 11/138520 | |
| DATED | : December 1, 2009 | |
| INVENTOR(S) | : Takayuki Hara | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1223 days.

Signed and Sealed this

Twenty-first Day of December, 2010

David J. Kappos
*Director of the United States Patent and Trademark Office*